United States Patent
Timmermann et al.

(10) Patent No.: US 9,913,319 B2
(45) Date of Patent: Mar. 6, 2018

(54) PANE ARRANGEMENT HAVING AN ELECTRICALLY HEATABLE BAFFLE PLATE

(71) Applicant: SAINT-GOBAIN GLASS FRANCE, Courbevoie (FR)

(72) Inventors: Alwin Timmermann, Cologne (DE); Dirk Wohlfeil, Raeren (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 263 days.

(21) Appl. No.: 14/371,107

(22) PCT Filed: Feb. 6, 2013

(86) PCT No.: PCT/EP2013/052268
§ 371 (c)(1),
(2) Date: Jul. 8, 2014

(87) PCT Pub. No.: WO2013/131700
PCT Pub. Date: Sep. 12, 2013

(65) Prior Publication Data
US 2015/0034621 A1 Feb. 5, 2015

(30) Foreign Application Priority Data
Mar. 5, 2012 (EP) .................. 12158006

(51) Int. Cl.
*B60R 11/04* (2006.01)
*H05B 3/84* (2006.01)
(Continued)

(52) U.S. Cl.
CPC ............... *H05B 3/03* (2013.01); *B60R 11/04* (2013.01); *H05B 3/10* (2013.01); *H05B 3/84* (2013.01);
(Continued)

(58) Field of Classification Search
None
See application file for complete search history.

(56) References Cited

U.S. PATENT DOCUMENTS 5,804,817 A * 9/1998 Seiler .................... B60S 1/0822
250/227.25
6,144,017 A * 11/2000 Millett .................... F25D 21/02
219/203

(Continued)

FOREIGN PATENT DOCUMENTS

CN 102171068 A 8/2011
DE 10156850 1/2003
(Continued)

OTHER PUBLICATIONS

Written Opinion mailed on Mar. 15, 2013 for international application PCT/EP2013/052268 filed on Feb. 6, 2013 in the name of Saint-Gobain Glass France—German with English translation.
(Continued)

*Primary Examiner* — Joseph M Pelham
(74) *Attorney, Agent, or Firm* — Steinfl + Bruno LLP

(57) ABSTRACT

A pane arrangement having an electrically heatable baffle plate is described. The pane arrangement has a pane having an enclosure on the inner side of the pane, a radiation receiver and/or a radiation source facing the pane within the enclosure such that a beam path of electromagnetic radiation passes through a predefined region of the pane, a baffle plate arranged within the enclosure and below the beam path, and an electrically heatable area in the baffle plate heating the region.

26 Claims, 7 Drawing Sheets

Figure 1:
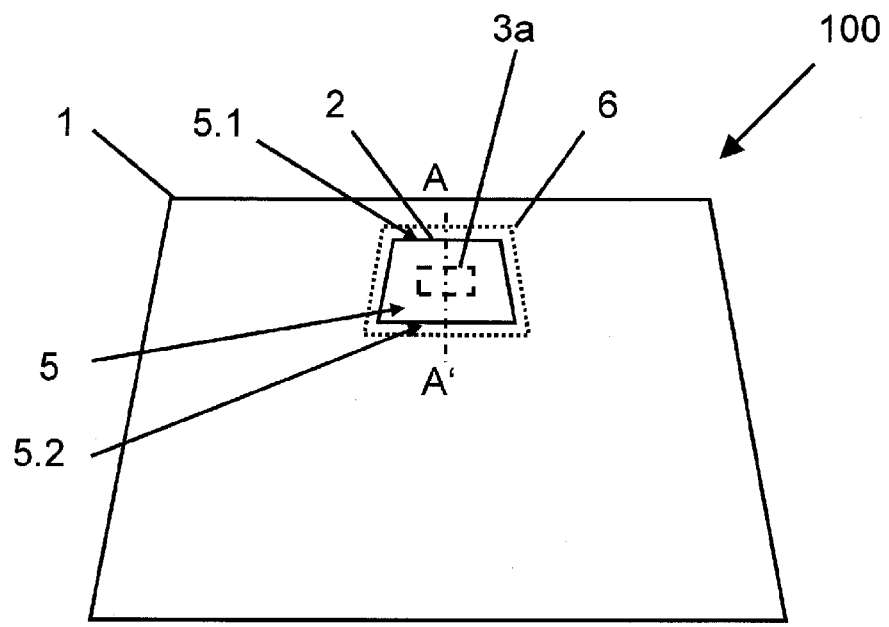

(51) Int. Cl.
  *H05B 3/03*   (2006.01)
  *H05B 3/10*   (2006.01)
  *B60R 11/00*  (2006.01)

(52) U.S. Cl.
  CPC . *B60R 2011/0026* (2013.01); *H05B 2203/008* (2013.01); *H05B 2203/032* (2013.01); *Y10T 29/49083* (2015.01)

(56) References Cited

U.S. PATENT DOCUMENTS

| | | | | |
|---|---|---|---|---|
| 6,654,550 | B1* | 11/2003 | Lemanski | B60S 3/045 |
| | | | | 219/203 |
| 7,731,373 | B2* | 6/2010 | Oskarsson | B60S 1/026 |
| | | | | 219/203 |
| 8,907,250 | B2* | 12/2014 | Bressand | B60R 11/04 |
| | | | | 219/203 |
| 2003/0059218 | A1* | 3/2003 | Sakata | G03B 17/08 |
| | | | | 396/429 |
| 2008/0284850 | A1* | 11/2008 | Blaesing | B60S 1/0822 |
| | | | | 348/148 |
| 2011/0204037 | A1 | 8/2011 | Seaborn | |
| 2011/0207037 | A1 | 8/2011 | Yasukawa et al. | |
| 2011/0233248 | A1 | 9/2011 | Flemming et al. | |
| 2012/0103960 | A1* | 5/2012 | Bressand | B60R 11/04 |
| | | | | 219/203 |
| 2012/0119104 | A1* | 5/2012 | Arslan | B60R 11/04 |
| | | | | 250/395 |
| 2013/0314540 | A1* | 11/2013 | Hacker | B60J 1/002 |
| | | | | 348/148 |

FOREIGN PATENT DOCUMENTS

| | | | |
|---|---|---|---|
| DE | 102004054161 | | 8/2006 |
| DE | 102006007343 | | 8/2007 |
| DE | 102007012993 | | 9/2007 |
| DE | 102009026021 | | 12/2010 |
| EP | 1605729 | | 12/2005 |
| JP | S59202954 | A | 11/1984 |
| JP | S61247536 | A | 11/1986 |
| JP | 2002341432 | A | 11/2002 |
| JP | 2008083298 | A | 4/2008 |
| JP | 2010102997 | | 5/2010 |
| WO | 2004020250 | | 3/2004 |
| WO | 2011088330 | | 7/2011 |
| WO | WO 2016105674 A1 * | 6/2016 | ............ B60R 11/04 |

OTHER PUBLICATIONS

International Search Report mailed on Mar. 15, 2013 for International Application PCT/EP2013/052268 filed on Feb. 6, 2013 in the name of Saint-Gobain Glass France (German original, English Translation).

\* cited by examiner

PANE ARRANGEMENT HAVING AN ELECTRICALLY HEATABLE BAFFLE PLATE

CROSS REFERENCE TO RELATED APPLICATIONS

The present application is the US national stage of International Patent Application PCT/EP2013/052268 filed on Feb. 6, 2013 which, in turn, claims priority to European Patent Application EP 12158006.2 filed on Mar. 5, 2012.

The invention relates to a pane arrangement having an electrically heatable baffle plate, in particular for heating an optically transparent pane region by means of radiant heat, a method for its production, and its use.

Many motor vehicles, airplanes, helicopters, and ships are equipped with various optical sensors. Examples of optical sensors are camera systems, such as video cameras, night vision cameras, residual light amplifiers, or passive infrared detectors, such as FLIR (forward looking infrared). The camera systems can use light in the ultraviolet (UV), visible (VIS), and infrared wavelength range (IR). Thus, even under bad weather conditions, such as darkness and fog, objects, motor vehicles, and people can be precisely detected. These camera systems can be placed in motor vehicles behind the windshield in the passenger compartment. Thus, even in traffic, they offer the possibility of detecting hazardous situations and obstacles in a timely manner.

There are additional fields of application for optical sensors in electronic distance measurement (EDM), for example, using laser range finders. The distance to other motor vehicles can be determined. Such systems are widely used in the military sector but there are many possible applications in the civilian sector as well. With measurements of the distance from the preceding vehicle, it is possible to determine the necessary safe following distance and significantly increase traffic safety.

Because of their sensitivity to weather conditions or aerodynamics around the vehicle, such sensors must, in all cases, be protected by appropriate panes. The sensor can either be installed inside a motor vehicle or outside as with thermal imaging cameras of helicopters. In the latter case, the sensor is installed outside on the helicopter in a pivotable housing. To ensure optimal function of the optical sensors, with both options, clean and condensation-free panes are absolutely essential.

The same is true for radiation sources that are arranged on the inner side of motor vehicle glazings. Such radiation sources are, for example, optical lighting elements, such as a third brake light behind a rear window. the optical lighting elements shine through a pane region, which, for aesthetic and practical reasons is usually not heated by heating conductors. This is, for example, the case, when this region of the pane is used for antennas that are not connected to the heating field.

Condensation and icing hamper the functioning of the sensors and the light sources since they significantly reduce the transmission of electromagnetic radiation. Whereas wiper systems can be used for water drops and dirt particles, they are, as a rule, inadequate in the case of icing. In this case, systems that at least briefly heat the pane segment associated with the sensor or the light source when needed and thus enable uninterrupted use are essential.

In addition to the external pane surface, the inside pane above all must be kept free of condensation. So that no dirt and dust particles foul the sensor or the light source, the arrangement consisting of the sensor or light source and pane is, as a rule, encapsulated. If moisture penetrates into this encapsulated space, this moisture can, especially with cold outside temperatures, condense on the inside of the pane and restrict transmission through the pane region.

DE 101 56 850 A1 discloses a sensor in a motor vehicle window pane, the lens of which sensor is sealed off from the vehicle interior by an enclosure. This construction prevents the deposition of dust particles on the lens. A particle filter is provided for air exchange.

DE 10 2004 054 161 A1 discloses an infrared detection region in a motor vehicle windshield. The infrared detection region is surrounded by heating elements that keep it free of ice and condensation by thermal conduction.

EP 1 605 729 A2 discloses an electrically heatable pane with a camera window. This camera window is kept free of condensation and ice by a heating arrangement. The heating element is laminated into the pane at the position of the camera window. Also, an additional heating element can be applied on the surface of the pane. The additional heating element is preferably printed onto the surface of the pane as conductive paste.

U.S. 2011/0204037 A1 discloses a heating arrangement for the region of the wiper resting position of windshields. The heating of this region of the windshield is generated by direct contact of the windshield with the heating element or by valves with warm air.

WO 2004/020250 A1 discloses a method and a device for fastening a sensor on a motor vehicle window.

The object of the invention consists in making available an improved pane arrangement with a heatable baffle plate, which enables heating a region of the pane and is simply and economically producible from finished, standard panes without major retrofitting measures.

The object of the present invention is accomplished according to the invention by means of a pane arrangement having an electrically heatable baffle plate according to independent claim 1. The invention further comprises a method for its production and its use according to independent claims 13 and 14. Preferred embodiments emerge from the subclaims.

The pane arrangement according to the invention comprises at least:
- a pane with an enclosure on the inner side of the pane,
- a radiation receiver that is turned toward the pane within the enclosure such that a beam path of electromagnetic radiation passes through a predefined region of the pane,
- a baffle plate that is arranged within the enclosure and below the beam path, and
- an electrically heatable area in the baffle plate that heats the region.

An alternative pane arrangement according to the invention comprises at least:
- a pane with an enclosure on the inner side of the pane,
- a radiation source that is turned toward the pane within the enclosure such that a beam path of electromagnetic radiation passes through a predefined region of the pane,
- a baffle plate that is arranged within the enclosure and below the beam path, and
- an electrically heatable area in the baffle plate that heats the region.

When the electrically heatable area is heated, it emits thermal radiation and heats the predefined region of the pane by means of the thermal radiation. For this, it is necessary that the beam path of the radiation receiver or the radiation source run between the predefined region of the pane and the baffle plate, so that the beam path is not obstructed or restricted.

The pane arrangement comprises at least one pane and at least one predefined region of the pane. The predefined region must be transparent to the electromagnetic information or signals that are to be received by the radiation receiver or that are to be transmitted through the region by the radiation source. The region can be any part of the pane or an inserted pane segment that has high transmission for the corresponding optical electromagnetic signals. The characteristic "transparent" refers, in the context of the invention, to the transparency in the wavelength range relevant for the radiation receiver or the radiation source. For radiation receivers or radiation sources in the visible range and/or in the infrared range, the transmission for wavelengths from 200 200 nm to 2000 nm is preferably more than 60%, particularly preferably >70%, and in particular >90%. For radiation receivers or radiation sources in the infrared range, the transmission in the wavelength range from 800 nm to 1300 nm is preferably more than 60%, particularly preferably >70%, and in particular >90%. The region preferably takes up less than 10%, particularly preferably less than 5% of the surface of the pane.

The radiation receiver according to the invention is, for example, a camera or a light-sensitive sensor that can detect infrared, visible, and/or ultraviolet electromagnetic radiation. The radiation receiver preferably includes cameras for visible light of the wavelengths from 400 nm to 800 nm and/or infrared light of the wavelengths from 800 nm to 1300 nm.

The radiation source according to the invention is preferably a light source, for example, at least one incandescent bulb or a light emitting diode that can emit infrared, visible, and/or ultraviolet electromagnetic radiation.

The enclosure protects the radiation receiver or the radiation source against dirt and dust particles as well as unwanted incident light. The enclosure is preferably arranged in the upper pane region, preferably no farther than 30% of the pane height from the upper and/or lower edge. The enclosure preferably contains a polymer, particularly preferably polybutylene terephthalate, polyamides, polycarbonate, polyurethanes, polybutylene, polypropylene, polyethylene, polyethylene terephthalate, polyvinyl chloride, polystyrene, acrylonitrile butadiene styrene, ethylene vinyl acetate, ethylene vinyl alcohol, polyimides, polyesters, polyketones, polyether ether ketones, and/or polymethyl methacrylate as well as mixtures, block polymers, and copolymers thereof.

The pane preferably contains glass and/or polymers, preferably flat glass, float glass, quartz glass, borosilicate glass, soda lime glass, polymethyl methacrylate, polycarbonate, and/or mixtures or layered composites thereof. The pane preferably comprises single pane security glass (ESG) or laminated security glass (VSG).

The predefined region preferably has an opaque and/or colored edge. The edge can be implemented both as an edge strip or as an edge region.

The baffle plate according to the invention has an electrically heatable area. The baffle plate is arranged such that the beam path of the electromagnetic radiation that the radiation receiver receives or that the radiation source emits is situated between the baffle plate and the pane. This refers in in particular to the part of the beam path that runs within the enclosure. The electrically heatable area can be a separate component that is, for example, bonded to the baffle plate, for example, glued, soldered, pressed on, or welded. The electrically heatable area can also be a region of the material of the baffle plate.

It is particularly advantageous for the predefined region and the electrically heatable area to run as nearly parallel as possible such that the thermal radiation that leaves the electrically heatable area strikes the region of the pane as nearly perpendicular as possible. Moreover, it is advantageous for no other components or parts of the enclosure to be able to shield the thermal radiation.

If the heatable area of the baffle plate and of the predefined region of the pane through which the beam path runs are arranged in parallel, a much greater installation space is required, which, in the case of an arrangement on a motor vehicle pane, protrudes undesirably far into the interior. In an advantageous embodiment of the invention, the angle α between the predefined region and the baffle plate is from 5° to 65° and preferably from 10° to 45°. Thus, a flatter arrangement of the baffle plate on the pane is enabled.

The electrically heatable area of the baffle plate advantageously has a footprint of 20 $cm^2$ to 300 $cm^2$, preferably of 20 $cm^2$ to 40 $cm^2$ for arrangements on a windshield and of 100 $cm^2$ to 300 $cm^2$ for rear windows of motor vehicles. The base area is preferably trapezoid shaped, with the larger of the two parallel sides arranged directly adjacent the pane.

In an advantageous embodiment of the invention, the heating output of the electrically heatable area is selected such that it has a temperature from 30° C. to 90° C., preferably 50° C. to 70° C. For this, typically, a heating output from 0.5 $W/dm^2$ to 10 $W/dm^2$ is required. Such heating output is sufficient to free the inner side of the pane of condensation in the predefined region under the standard conditions of motor vehicle engineering by means of radiant heat.

In another advantageous embodiment of the invention, the electrically heatable area has radiated power from 0.5 $W/dm^2$ to 5 $W/dm^2$. Such radiated power is sufficient to free the inner side of the pane of condensation in the predefined region under the standard conditions of motor vehicle engineering by means of radiant heat.

A baffle plate according to the invention advantageously has thermal conductivity of more than 80 W/(m K), preferably more than 190 W/(m K), particularly preferably more than 300 W/(m K) auf. The surface of the baffle plate advantageously has emissivity of 0.7 to 0.97. For this, the baffle plate according to the invention advantageously contains, or is made of, a metal, preferably aluminum, copper, spring bronze, and/or steel. Baffle plates made of aluminum can, for example, be manufactured in bulk by the meter in continuous casting. Baffle plates made of copper are preferably pressed or stamped from solid copper plates.

In particular, the baffle plate is made of aluminum, of which the surface facing the pane has been black anodized. This has the particular advantage that scattered light that enters from outside through the pane into the enclosure is not reflected into the radiation receiver and, consequently, causes no interference signals.

In an advantageous embodiment, the baffle plate is patterned on the surface facing the pane and, in particular, on the side facing the beam path. The patterning is, for example, fluting or a zigzag or wave-shaped form. This has the particular advantage that, as much as possible, scattered light is not reflected into the radiation receiver.

The baffle plate according to the invention can advantageously include a heatable coating and/or heating wires. The coating or the heating wires preferably contain fluorine-doped tin dioxide ($F:SnO_2$), tin-doped indium oxide (ITO), silver, copper, tin, gold, aluminum, iron, tungsten, chromium, or alloys thereof and/or at least one electrically conductive organic polymer. The heatable coating preferably has a layer thickness of 0.1 μm to 50 μm, particularly preferably 1 μm to 10 μm.

An alternative baffle plate according to the invention contains in a first region, outside the electrically heatable area, a heating element, preferably a heating cartridge. Such heating cartridges are particularly economical and easy to install. Due to the high thermal conductivity of the material of the baffle plate, the entire baffle plate is heated. This results in indirect heating of the heatable area and, in turn, to radiant heating of the region.

The enclosure is advantageously bonded to the pane by an adhesive. The adhesive preferably contains acrylic adhesives, methyl methacrylate adhesives, cyanoacrylate adhesives, polyepoxides, silicone adhesives, and/or silane-curing polymer adhesives as well as mixtures and/or copolymers thereof.

The enclosure is advantageously designed in multiple parts, with a support part bonded to the pane by an adhesive and a cover for service purposes detachably connected to the support part.

The enclosure is preferably arranged in the upper region of the windshield and/or rear window, particularly preferably behind a cover strip, a sunshield, and/or a band filter.

The enclosure preferably contains water absorbent materials or desiccants, particularly preferably silica gel, $CaCl_2$, $Na_2SO_4$, activated carbon, silicates, bentonites, zeolites, and/or mixtures thereof. The desiccants can be incorporated into the surface of the enclosure and/or arranged in open containers in the enclosure. The desiccants are preferably arranged such that an air and moisture exchange with the air in the interior of the enclosure is possible, but the materials are fixed and cannot fly around. This can preferably be accomplished by enclosing the desiccants in an air and moisture permeable polymer film or in a fine meshed net.

The invention further comprises a method for producing a pane arrangement having an electrically heatable baffle plate, wherein
a. the enclosure is fastened to the predefined region of the pane,
b. the radiation receiver and/or the radiation source is arranged in the enclosure, and
c. the baffle plate is arranged in the enclosure, with the beam path of the radiation receiver and/or the radiation source running between the pane and the baffle plate.

The invention further comprises the use of the pane arrangement according to the invention in motor vehicles, ships, airplanes, and helicopters and preferably as a windshield and/or rear window of a motor vehicle.

It is understood that the different embodiments can be realized individually or in any combinations. In particular, the characteristics mentioned above and to be explained in the following can be used not only in the combinations indicated but also in other combinations or alone, without departing from the scope of the present invention.

The invention is explained in detail in the following with reference to drawings. The drawings are schematic depictions and not true to scale. The drawings in no way restrict the invention.

Figure 2:
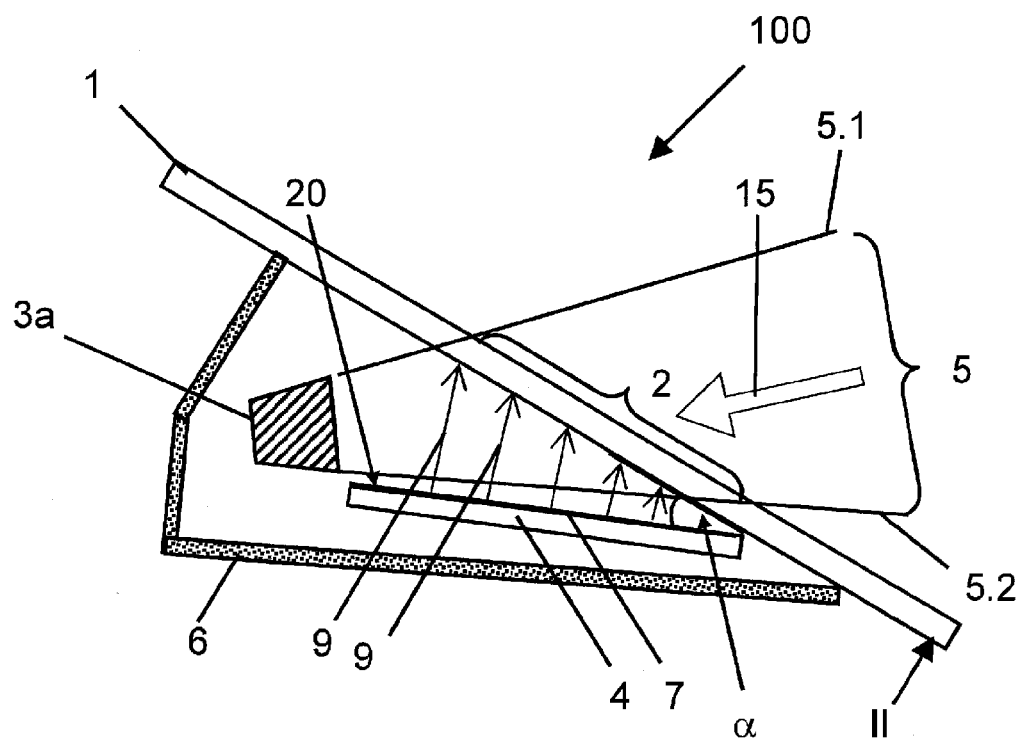
Figure 3:
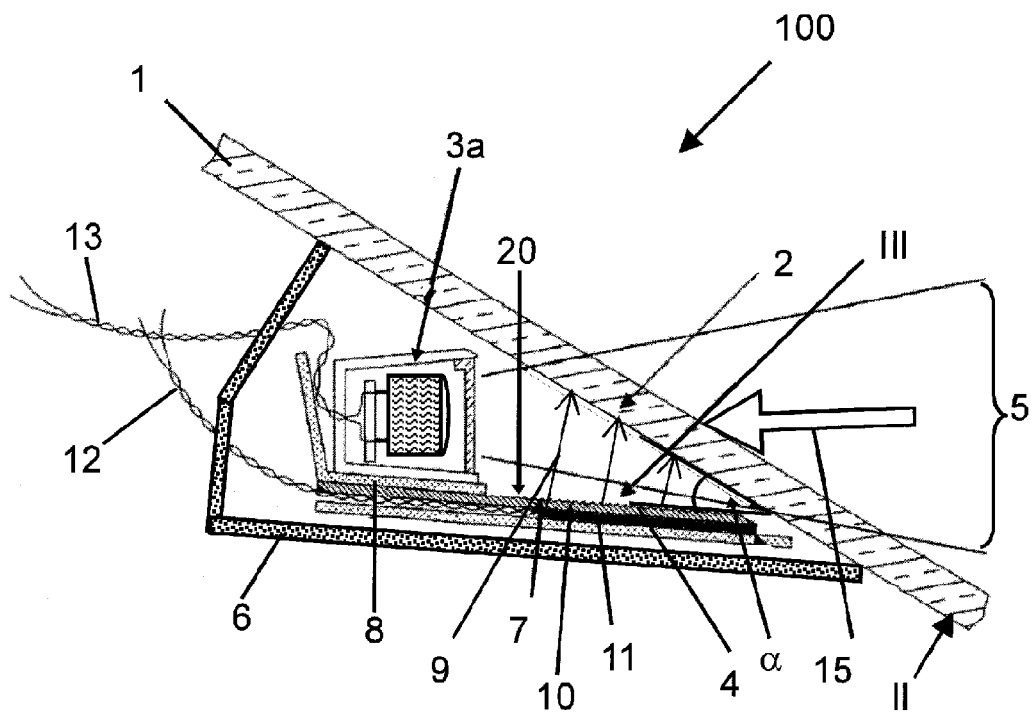
Figure 4:
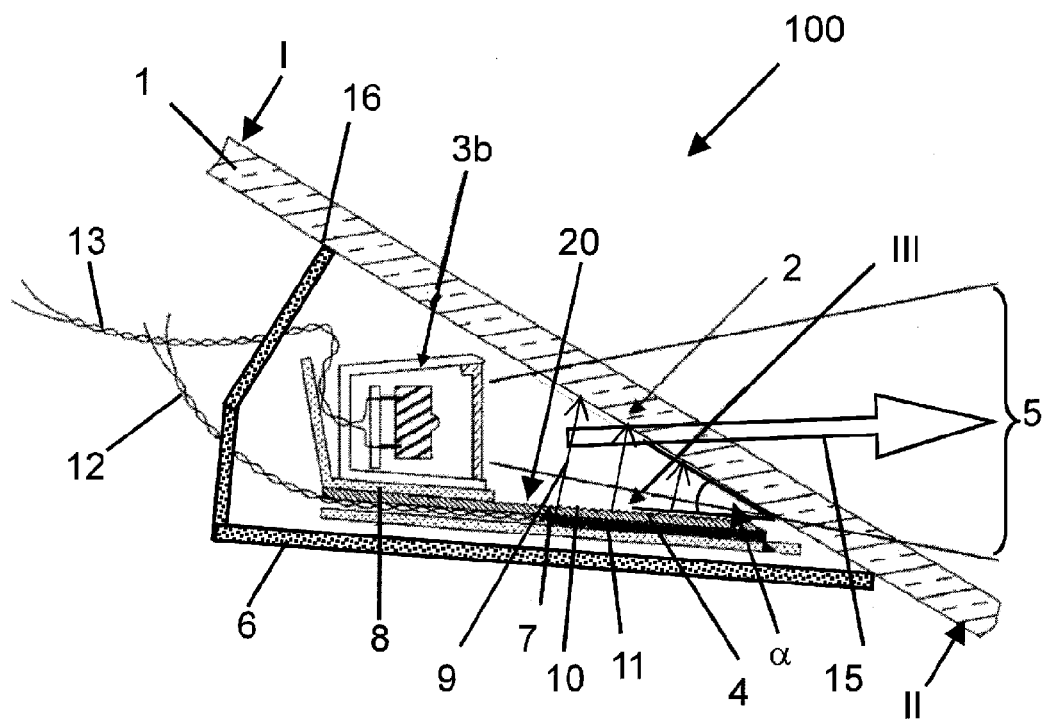
Figure 5:
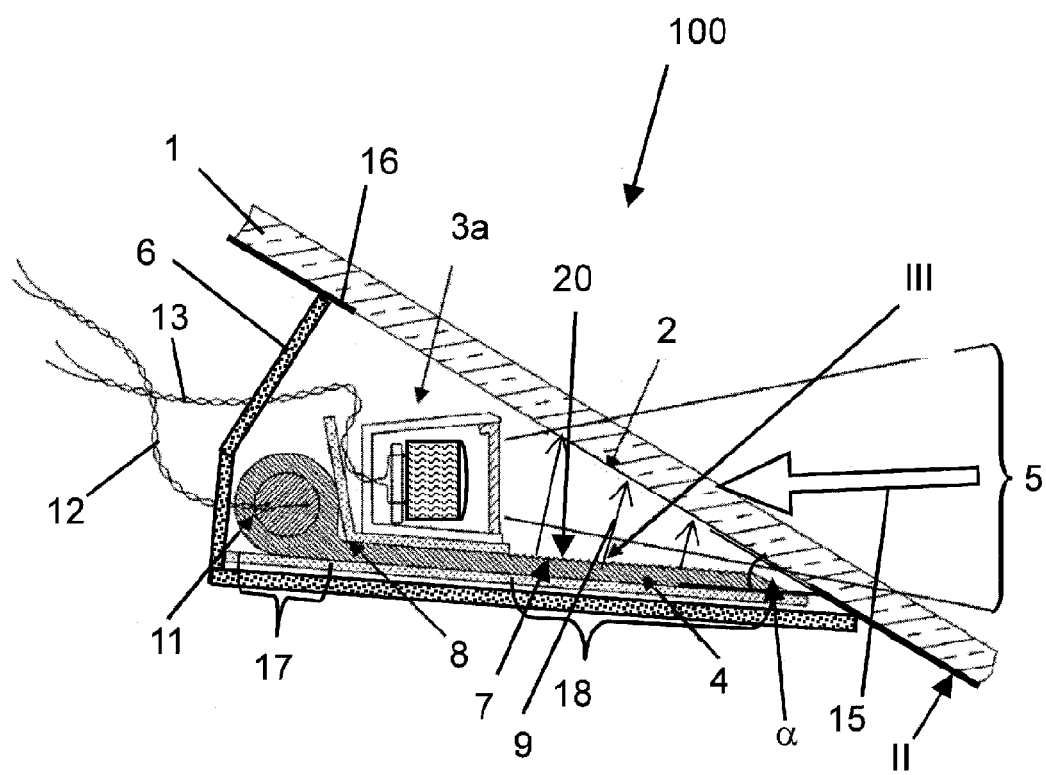
Figure 6A:
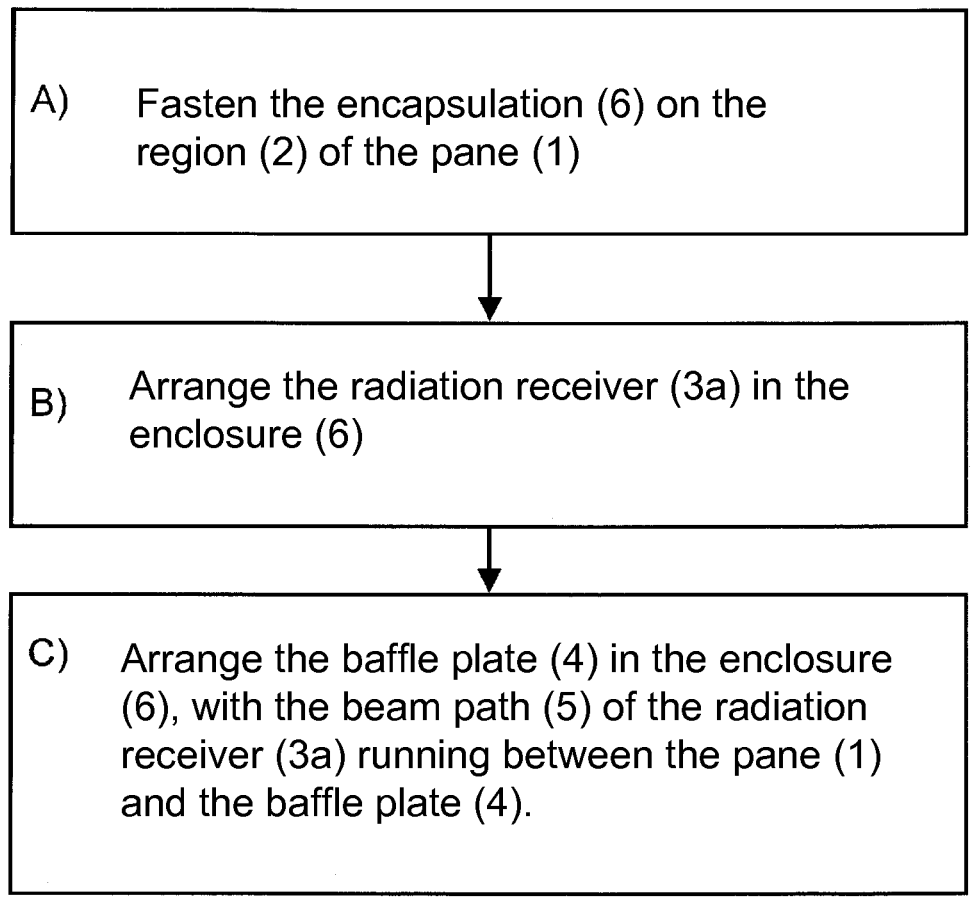
Figure 6B:
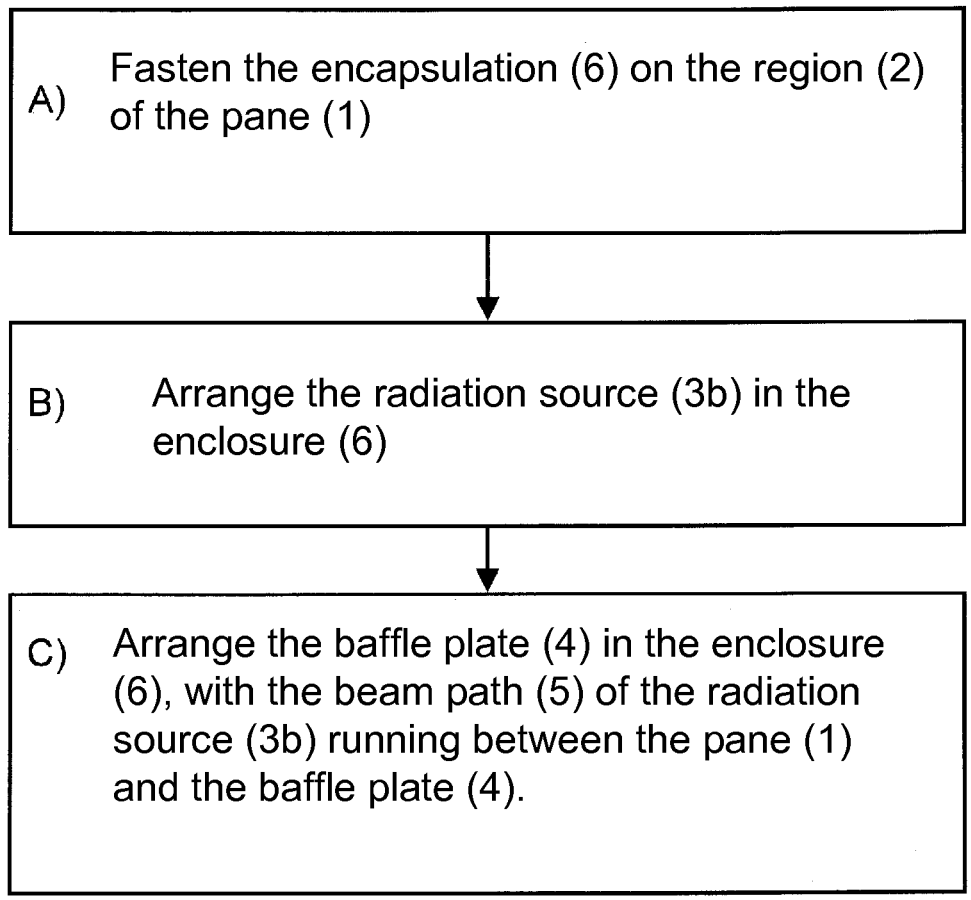

They depict:

FIG. 1 a top plan view of an exemplary embodiment of a pane arrangement according to the invention, FIG. 2 a simplified, schematic representation of a cross-section of a pane arrangement according to the invention, FIG. 3 a cross-section of a detail of a pane arrangement according to the invention, FIG. 4 a cross-section of a detail of an alternative embodiment of a pane arrangement according to the invention, FIG. 5 a cross-section of a pane arrangement according to the invention, FIG. 6a a flowchart of a preferred embodiment of the method according to the invention, and FIG. 6b a flowchart of an alternative embodiment of the method according to the invention.

FIG. 1 depicts a top plan view of a pane arrangement 100 according to the invention. An enclosure 6, a radiation receiver 3a, and a region 2 that is predefined by the beam path 5 through the pane 1 are arranged in the upper region of the pane 1. The beam path 5 has an upper edge 5.1 and a lower edge 5.2.

FIG. 2 depicts a simplified, schematic representation of a cross-section along section line A-A' of FIG. 1. The enclosure 6 is arranged on the inner side II of the pane 1. In the case of a motor vehicle pane, the inner side II is the side of the pane 1 turned toward the vehicle interior.

Within the enclosure 6 and below the pane 1, a radiation receiver 3a is arranged. The beam path 5 of the radiation receiver 3a runs in a funnel shape from the emission lens of the radiation receiver 3a through the pane 1. The beam path 5 of the visual field penetrates the pane 1 in a region 2 that lies between the upper edge 5.1 of the beam path 5 and the lower edge 5.2 of the beam path 5. The region 2 must be sufficiently transparent to the electromagnetic radiation 15 of the radiation receiver 3a.

Below the radiation receiver 3a, a baffle plate 4 is arranged. The baffle plate 4 reaches from the radiation receiver 3a all the way to the pane 1. The baffle plate 4 is arranged outside and, in particular, below the beam path 5 of the radiation receiver 3a, in order not to restrict the beam path 5. The baffle plate 4 borders the region 2 of the pane 1 at an angle α of, for example, 30°.

The baffle plate 4 has on the top surface 20 an electrically heatable area 7. The electrically heatable area 7 can be heated directly, for example, by a heating conductor on the surface 20. The electrically heatable area 7 can also be heated indirectly, for example, by an electrical heating element in another region of the baffle plate 4, with the electrically heatable area 7 heated by the thermal conduction of the material of the baffle plate 4.

The electrically heatable area 7 is arranged opposite the region 2 of the pane 1. When the electrically heatable area 7 is heated, it heats the region 2 of the pane 1 by thermal radiation 9 and thus frees it of condensation. For this, it is particularly advantageous for the region 2 and the electrically heatable area 7 to run as nearly parallel as possible such that the thermal radiation 9 that leaves the electrically heatable area 7 strikes the region 2 of the pane 1 as nearly perpendicular as possible. At the same time, a very large installation space would be required that would protrude undesirably far into the interior in the case of an arrangement on a motor vehicle pane. Consequently, a certain angle α of 5° to 45° and, for example, 30°, is preferred.

FIG. 3 depicts a cross-section through a pane arrangement 100 according to the invention in the region of an enclosure 6. The cross-section runs along the section line A-A' of FIG. 1. The enclosure 6 is arranged on the inner side II of a pane 1 and fastened on the pane 1 by gluing with an acrylic adhesive. The pane 1 is, for example, a windshield of a motor vehicle and, for example, a laminated safety glass. The inner side II is the side of the pane 1 turned toward the vehicle interior. The enclosure contains, for example, polybutylene terephthalate with a 10% fraction of glass fibers (PBT-GF10) and was produced by an injection molding process.

Within the enclosure 6 and below the pane 1, a radiation receiver 3a is arranged. The radiation receiver 3a is, for example, an infrared camera for a night driving assistance system. The radiation receiver 3a detects, in particular, infrared electromagnetic radiation 15 in the wavelength range from 800 to 1100 nm. The field of vision of the radiation receiver 3a is oriented for image capture of the space in front of the vehicle. The beam path 5 of the field of vision runs in the shape of a funnel from the emission lens of the radiation receiver 3a through the pane 1. The beam path 5 of the field of vision penetrates the pane 1 in a region 2. The region 2 must be sufficiently transparent to the infrared electromagnetic radiation 15 of the radiation receiver 3a. The pane 1 has, in the region 2, for example, a transparency for infrared radiation in the wavelength range from 800 nm to 1100 nm of more than 70%. The radiation receiver 3a is connected by supply lines 13 to evaluation electronics (not shown).

A baffle plate 4 is arranged below the radiation receiver 3a. Here, "below" means, in the case of a motor vehicle pane in the installed state, vertical and closer to the bottom of the vehicle. The baffle plate 4 reaches from the radiation receiver 3a all the way to the pane 1. The baffle plate 4 is arranged below the beam path 5 of the radiation receiver 3a in order not to restrict the field of vision of the space in front of the vehicle. The baffle plate 4 borders on the region 2 of the pane 1 at an angle $\alpha$ of, for example, 30°.

The baffle plate 4 is made, for example, of aluminum with thermal conductivity of 200 W/(m K). The baffle plate 4 is black anodized on the surface 20 visible through the pane 1 from outside. Furthermore, the surface 20 has a zigzag or wave-shaped patterning 10. Thus, unwanted reflections from laterally entering scattered light into the radiation receiver 3a are reduced or prevented.

The baffle plate 4 has on the surface 20 an electrically heatable area 7. In the example depicted, the heating of the area 7 is done by means of an electrical heating element 11 on the bottom of the baffle plate 4. The footprint of the electrically heatable area 7 of the baffle plate 4 is, for example, 35 cm$^2$. The electrical heating element 11 is, for example, a heating wire or an electrically conductive coating and can be heated by an electric current. The heating element 11 is connected via supply lines 12 to a voltage source, for example, to the onboard electrical system of a motor vehicle.

If the electrical heating element 11 is heated by an electric current, the electrically heatable area 7 of the surface 20 of the baffle plate 4 heats up due to the high thermal conductivity of the material of the baffle plate 4. The heated area 7 is, in particular, suited to heat the region 2 of the pane 1 by means of thermal radiation 9 and to thus free it of condensation. As experiments of the inventor showed, a heating output of 6 W/dm$^2$ suffices to keep the inner side II of the pane 1 of a motor vehicle free of condensation in the region 2 with an outside temperature of 0° C.

FIG. 4 depicts a cross-section of an alternative embodiment of a pane arrangement 100 according to the invention. The pane arrangement 100 corresponds to the pane arrangement 100 of FIG. 1. Instead of the radiation receiver 3a, a radiation source 3b is arranged within the enclosure 6. The radiation source 3b contains, for example, ten red light-emitting diodes and serves as a so-called "third brake light" on the rear window of a motor vehicle. The enclosure 6 is, for example, arranged in an upper region of the pane 1, which has no printed-on or other heating structures. The electromagnetic radiation 15 of the radiation source 3b penetrates the pane 1 in a region 2. By means of the thermal radiation 9 that leaves the electrically heatable area 7 of the baffle plate 4, the region 2 can be kept free of condensation. Furthermore, the thermal radiation accelerates deicing of the outer side I of the pane 1 over the region 2.

FIG. 5 depicts a top plan view of another exemplary embodiment of a pane arrangement 100 according to the invention. An infrared-reflecting, low-emissivity coating 16 based on indium tin oxide is arranged on the inner side II of the pane 1. Such infrared-reflecting coatings 16 are, for example, known from WO 2011/088330 A2. The coating 16 has transparency for electromagnetic radiation in the visible range of roughly 80%, but absorbs a large share of infrared electromagnetic radiation. The coating 16 is removed within the enclosure 6 and, in particular, in the region 2 of the beam path 5 of the radiation receiver 3a. As a result of the decoating, a large part of the infrared radiation 15 can arrive at the radiation receiver 3a. The decoated region is hardly discernible anymore from the outside, due to the enclosure 6 on the inner side II of the pane 1 and the aesthetic appearance of the pane 1 is retained.

In the example depicted, the heating element 11 is arranged in a region 17 of the baffle pane 4 distant from the pane 1. The heating element 11 is, for example, an economical and easy to install heating cartridge, which was pressed into an opening of the aluminum body of the baffle plate 4. The heat generated in the heating element 11 is passed on to the region 18 and the area 7 due to the good thermal conductivity of the aluminum. The thus indirectly heated area 7 heats, by thermal radiation 9, the region 2 of the pane 1. To protect the radiation receiver 3a against excessively high temperatures, thermal insulation 8 is arranged between the radiation receiver 3a and the baffle plate 4. The thermal insulation 8 contains, for example, a polymer and, in particular, the material of the enclosure 6.

FIGS. 6a and 6b depict, in each case, a flowchart of a method according to the invention for producing a pane arrangement 100 according to the invention.

The present invention has a group of advantages compared to pane arrangements according to the prior art. With pane arrangements with radiation receivers or radiation sources according to the prior art, the pane is customarily heated in the surroundings of the region through which the electromagnetic radiation is transmitted. Since, if at all possible, no heating conductors should cross this region, the heating conductors are arranged on the outer edge of the region. The heating of the interior of the region occurs only by thermal conduction. Since glass is a poor thermal conductor, the region is very inhomogeneously and insufficiently heated. No satisfactory result can be obtained with this type of heating of the region.

With the present invention, the region 2 is heated directly by thermal radiation 9. The transfer of sufficient heating output occurs only due to thermal radiation. This permits uniform energy input to the region to be heated. At the same time, it is possible to keep the necessary energy consumption low.

The electrically heatable baffle plate 4 according to the invention is simple to integrate into an already existing enclosure 6 of a camera or of a third brake light and replaces there, for example, an already present non-heatable baffle plate. The power supply of the baffle plate 4 according to the invention can take place simply via the power supply of the camera or of the brake light.

For the person skilled in the art, it was unexpected and surprising that the transfer of thermal radiation with the pane arrangement according to the invention is sufficient to keep the region to be heated free of condensation.

LIST OF REFERENCE CHARACTERS 1 pane
2 region
3a radiation receiver
3b radiation source
4 baffle plate
5 beam path
5.1 upper edge of the beam path 5
5.2 lower edge of the beam path 5
6 enclosure
7 heatable area
8 thermal insulation
9 thermal radiation
10 patterning, fluting
11 heating element
12 supply line to the heating element 7 or to the heating area 11
13 supply line to the radiation receiver 3a or to the radiation source 3b
15 electromagnetic radiation
16 coating
17 first region of the baffle plate 4
18 second region of the baffle plate 4
20 surface of the baffle plate 4
100 pane arrangement
α angle between pane 1 and baffle plate 4
I outer side of the pane 1
II inner side of the pane 1
III side of the baffle plate 4
A-A' section line

The invention claimed is:

1. A pane arrangement having an electrically heatable baffle plate, comprising at least:
   a pane with an enclosure on the inner side of the pane,
   a radiation receiver and/or a radiation source, which is/are turned toward the pane within the enclosure such that a beam path of electromagnetic radiation passes through a predefined region of the pane,
   a baffle plate, which is arranged within the enclosure and below the beam path, and
   an electrically heatable area in the baffle plate that emits thermal radiation and heats the predefined region only by the thermal radiation.

2. The pane arrangement according to claim 1, wherein the radiation receiver contains a camera or a light-sensitive sensor for infrared, visible, and/or ultraviolet electromagnetic radiation.

3. The pane arrangement according to claim 1, wherein the radiation source contains an incandescent bulb or a light-emitting diode for infrared, visible, and/or ultraviolet electromagnetic radiation.

4. The pane arrangement according to claim 1, wherein the baffle plate contains, or is made of, a metal.

5. The pane arrangement according to claim 1, wherein the baffle plate has thermal conductivity of more than 80 W/(m K).

6. The pane arrangement according to claim 1, wherein the baffle plate has, at an edge of the electrically heatable area, an electrical heating element, and wherein the electrically heatable area is heatable by thermal conduction.

7. The pane arrangement according to claim 1, wherein the predefined region and the electrically heatable area have each a substantially planar shape, and wherein an angle between a plane defining the predefined region and a plane defining the electrically heatable area is from 5° to 65°.

8. The pane arrangement according to claim 1, wherein the region has transparency for electromagnetic radiation of >60%.

9. The pane arrangement according to claim 1, wherein the electrically heatable area has a heating output of 0.5 W/dm$^2$ to 10 W/dm$^2$.

10. The pane arrangement according to claim 1, wherein the baffle plate has a patterning on the side turned toward the beam path.

11. The pane arrangement according to claim 1, wherein the pane contains glass, polymers, and/or mixtures thereof.

12. The pane arrangement according to claim 1, wherein the pane is of a substantially rectangular shape, and wherein the enclosure is arranged in an edge region of the pane between a center of the pane and an edge of the pane.

13. The pane arrangement according to claim 1, wherein the baffle plate has thermal conductivity of more than 190 W/(m K).

14. The pane arrangement according to claim 1, wherein the baffle plate has thermal conductivity of more than 300 W/(m K).

15. The pane arrangement according to claim 6, wherein the electrical heating element comprises a heating cartridge.

16. The pane arrangement according to claim 1, wherein the predefined region and the electrically heatable area have each a substantially planar shape, and wherein an angle between a plane defining the predefined region and a plane defining the electrically heatable area is from 10° to 45°.

17. The pane arrangement according to claim 1, wherein the region has transparency for electromagnetic radiation of >70%.

18. The pane arrangement according to claim 1, wherein the region has transparency for electromagnetic radiation of >90%.

19. The pane arrangement according to claim 4, wherein the metal comprises one or more of aluminum, copper, spring bronze, and steel.

20. The pane arrangement according to claim 4, wherein the metal comprises black anodized aluminum.

21. The pane arrangement according to claim 1, wherein the pane comprises at least one of flat glass, float glass, quartz glass, borosilicate glass, and soda lime glass.

22. The pane arrangement according to claim 1, wherein the pane comprises polymethyl methacrylate.

23. The pane arrangement according to claim 10, wherein the patterning of the baffle plate is a fluting or a zigzag or wave-shaped form.

24. A pane arrangement having an electrically heatable baffle plate, comprising at least:
   a pane with an enclosure on the inner side of the pane,
   a radiation receiver and/or a radiation source, which is/are turned toward the pane within the enclosure such that a beam path of electromagnetic radiation passes through a predefined region of the pane,
   a baffle plate, which is arranged within the enclosure and below the beam path, and
   an electrically heatable area in the baffle plate, which heats the predefined region,
   wherein the baffle plate has, at an edge of the electrically heatable area, an electrical heating element, and wherein the electrically heatable area is heatable by thermal conduction.

25. A method for producing the pane arrangement having an electrically heatable baffle plate according to claim 1, comprising:

arranging the radiation receiver and/or the radiation source in the enclosure, arranging the baffle plate in the enclosure, and fastening the enclosure on the predefined region of the pane, wherein the beam path of the radiation receiver and/or the radiation source runs between the pane and the baffle plate.

26. A method comprising:

using the pane arrangement having an electrically heatable baffle plate according to claim 1 in motor vehicles, ships, airplanes, and helicopters, as a windshield and/or a rear window of a motor vehicle.

\* \* \* \* \*